United States Patent [19]
Barrett et al.

[11] Patent Number: 5,321,233
[45] Date of Patent: Jun. 14, 1994

[54] ELECTROFUSION FITTING AND SEALING METHOD FOR DISTRIBUTION LINE

[75] Inventors: Robert E. Barrett, Plainfield; Kevin Murphy, Oakbrook, both of Ill.

[73] Assignee: Northern Illinois Gas, Aurora, Ill.

[21] Appl. No.: 946,522

[22] Filed: Sep. 15, 1992

[51] Int. Cl.⁵ .......................... H05B 3/26; F16L 47/02
[52] U.S. Cl. ..................... 219/535; 219/551; 285/41; 285/113
[58] Field of Search ................ 219/535, 551; 285/21, 285/41, 95, 113, 286; 156/158, 433

[56] References Cited

U.S. PATENT DOCUMENTS

| | | | |
|---|---|---|---|
| 3,987,276 | 11/1976 | Vogelsanger et al. | 219/535 |
| 4,515,177 | 5/1985 | Thalmann et al. | 219/535 |
| 4,655,480 | 4/1987 | Thalmann | 285/21 |
| 4,815,650 | 3/1989 | Reaux | 285/286 |
| 4,817,994 | 4/1989 | Bronnert | 285/286 |
| 4,894,521 | 1/1990 | Evans | 219/535 |

FOREIGN PATENT DOCUMENTS

| | | |
|---|---|---|
| 145581 | 6/1985 | European Pat. Off. |
| 341494 | 11/1989 | European Pat. Off. |

OTHER PUBLICATIONS

*Innogaz electrofusion system,* Trouvay & Cauvin, Inc., Houston, Tex. 77084, pamphlet, 1987.
*Stop The Flow In Plastic Pipe Without Shutdown,* T. D. Williamson, Inc., Tulsa, Okla. 74101, pamphlet, Mar. 1991.

*Primary Examiner*—Bruce A. Reynolds
*Assistant Examiner*—John A. Jeffery
*Attorney, Agent, or Firm*—Emrich & Dithmar

[57] ABSTRACT

An electrofusion fitting for sealing a distribution line, or main, includes upper and lower arcuate sleeve members securely coupled together about the line by means of nut and bolt combinations. Extending radially from the upper sleeve member is a cylindrical flange with a threaded end portion through which a line tapping tool may be inserted for either inserting a seal in the line or for coupling a branch line to the distribution line. A pair of electrodes extending from the upper sleeve member form an electrofusion circuit with a heating conductor disposed intermediate the line and upper sleeve member for forming a fusion bond therebetween. A sealing gasket is disposed about the flange opening in the upper sleeve member to provide an immediate, temporary seal between the upper sleeve member and the line to permit rapid sealing of the line followed by permanent electrofusion sealing of the fitting on the line permitting the immediate tending to any necessary repair work to the line. The fitting is preferably comprised of polyethylene for secure bonding to a distribution line of like composition.

21 Claims, 2 Drawing Sheets

ELECTROFUSION FITTING AND SEALING METHOD FOR DISTRIBUTION LINE

FIELD OF THE INVENTION

This invention relates generally to distribution lines such as for transporting a gas and is particularly directed to an arrangement and method for tapping and/or sealing a distribution line with an electrofusion fitting.

BACKGROUND OF THE INVENTION

Gas distribution lines are generally comprised of high strength, rugged plastic materials such as polyethylene. Sealed joining of polyethylene lines has traditionally been accomplished by fusion involving the application of heating elements (irons) to the areas to be fused. Application of heat to the areas to be joined renders these areas in a molten state, which is followed by the application of mechanical compression for joining polyethylene network components in a sealed manner. Later approaches made use of the heat provided by an electrical conductor to fuse the polyethylene members.

This electrofusion technique permitted the cold preassembly of network components and increased fusion surfaces for stronger seals in the fabrication of larger component assemblies. Stress cracks in the thus formed seal were also reduced as were errors arising from the human element. Early fusion techniques relied heavily on the operator's experience and know-how. Relatively minor variations in heating current or heating period could result in failure of mated components to bond and form an effective seal. A general description of polyethylene fusion is provided in a publication of Trouvay & Cauvin, Inc. of Houston, Tex. entitled "INOGAZ ELECTROFUSION SYSTEM" (1987).

A seal is installed in a gas distribution line generally for the purpose of performing work on the line without shutting down the gas distribution network. Frequently a seal is installed in the distribution line when the line has been damaged and is leaking in order to seal off the leaking section and allow for its repair. Under these circumstances, time is of the essence and it is desirable to seal and repair the line as soon as possible. Current procedures in the electrofusion installation of a seal require a cooling down period following fused coupling of adjacent members. This cool down period is typically on the order of 20-25 minutes and delays initiation of repair work. This cool down period permits the polyethylene to transition from the fluid state to that of a solid in forming the seal. One example of an arrangement for the electrofusion of polyethylene pipe can be found in a brochure entitled "Stop the Flow in Plastic Pipe Without Shutdown", published by T. D. Williamson, Inc. of Tulsa, Okla., in March, 1991. Not only are prior electrofusion approaches slow, but they are also overly complicated and expensive.

The present invention addresses the aforementioned limitations of the prior art by providing an immediate, temporary seal between a distribution line and an electrofusion fitting to permit the quick insertion of a seal in the line, followed by permanent electrofusion sealing between the fitting and the line after the line is repaired. This immediate sealing of the line allows any repair work necessary to the line after it is sealed off to be quickly and easily accomplished. The electrofusion fitting is also adapted for easily and quickly connecting a branch line to the distribution line without leakage.

OBJECTS AND SUMMARY OF THE INVENTION

Accordingly, it is an object of the present invention to provide an improved electrofusion fitting and sealing method for a pipeline such as a gas main.

It is another object of the present invention is to provide an initial temporary seal for quick installation of a stop in a distribution line followed by the application of electrofusion for a permanent seal.

Yet another object of the present invention is to provide an electrofusion fitting for quickly and easily installing a line stop in a gas distribution line.

A further object of the present invention is to provide an improved two-step approach to the installation of a gas distribution line stop or tapping fitting involving the sealing attachment of the fitting to the line initially by means of an O-ring for quick installation, followed by formation of an electrofusion seal for a permanent sealed connection.

A still further object of the present invention is to provide a self-contained, easily installed electrofusion fitting for installing either a line stop or a tapping sleeve in a gas pipeline.

It is another object of the present invention to provide a fitting of sufficient strength and rigidity for installing a line stop or a line tap in a sealed manner in a plastic pipeline.

These objects of the present invention are achieved and the disadvantages of the prior art are eliminated by a method for coupling a branch line to or sealing off a distribution line, the method comprising the steps of: securing a fitting to the distribution line about the circumference thereof, wherein the fitting includes an aperture and a flange on a side portion thereof; forming a temporary mechanical seal between the distribution line and the fitting about the aperture therein; tapping a hole in the distribution line through the flange and the aperture in the fitting and within the mechanical seal; inserting a plug in the distribution line through the hole tapped therein for sealing off the distribution line or attaching a branch line to the flange; and heating facing adjacent portions of the distribution line and the fitting about the aperture in the fitting to form a permanent electrofusion seal between the distribution line and the fitting.

The present invention further contemplates an electrofusion fitting for inserting a plug therein or for coupling a branch line to the distribution line in a sealed manner, the fitting comprising: a generally cylindrical sleeve disposed in tight-fitting engagement with an outer peripheral portion of the distribution line such that the distribution line is disposed within the cylindrical sleeve, the sleeve having an aperture in a lateral portion thereof; a generally cylindrical flange coupled to the sleeve and extending radially from the distribution line, wherein the flange is adapted to receive a tapping tool for cutting a hole in the distribution line for either inserting a plug therein for sealing the distribution line or for connecting a branch line to the distribution line; a gasket disposed intermediate the sleeve and the distribution line and about the aperture in the sleeve for forming a temporary seal between the sleeve and the distribution line; and an electrofusion arrangement disposed intermediate the sleeve and the distribution line about the gasket for heating and fusing adjacent portions of the sleeve and distribution line in forming a permanent seal therebetween.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
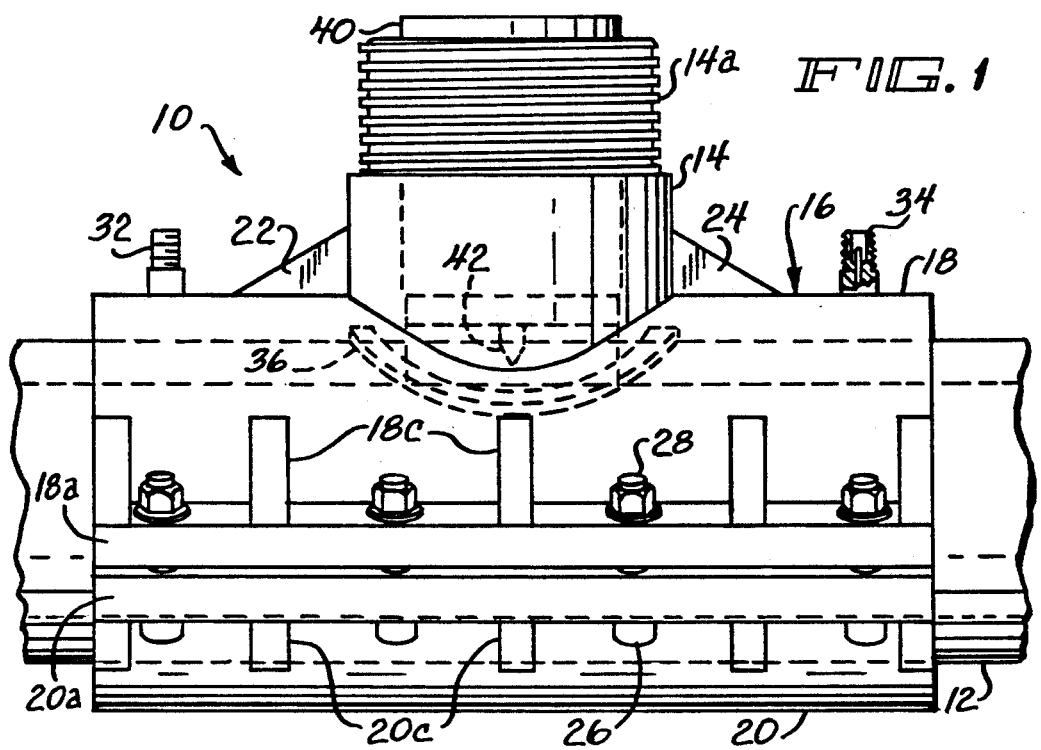
FIG. 1 is a side elevation view shown partially in phantom of an electrofusion fitting for a gas distribution line in accordance with the principles of the present invention.
Figure 4:
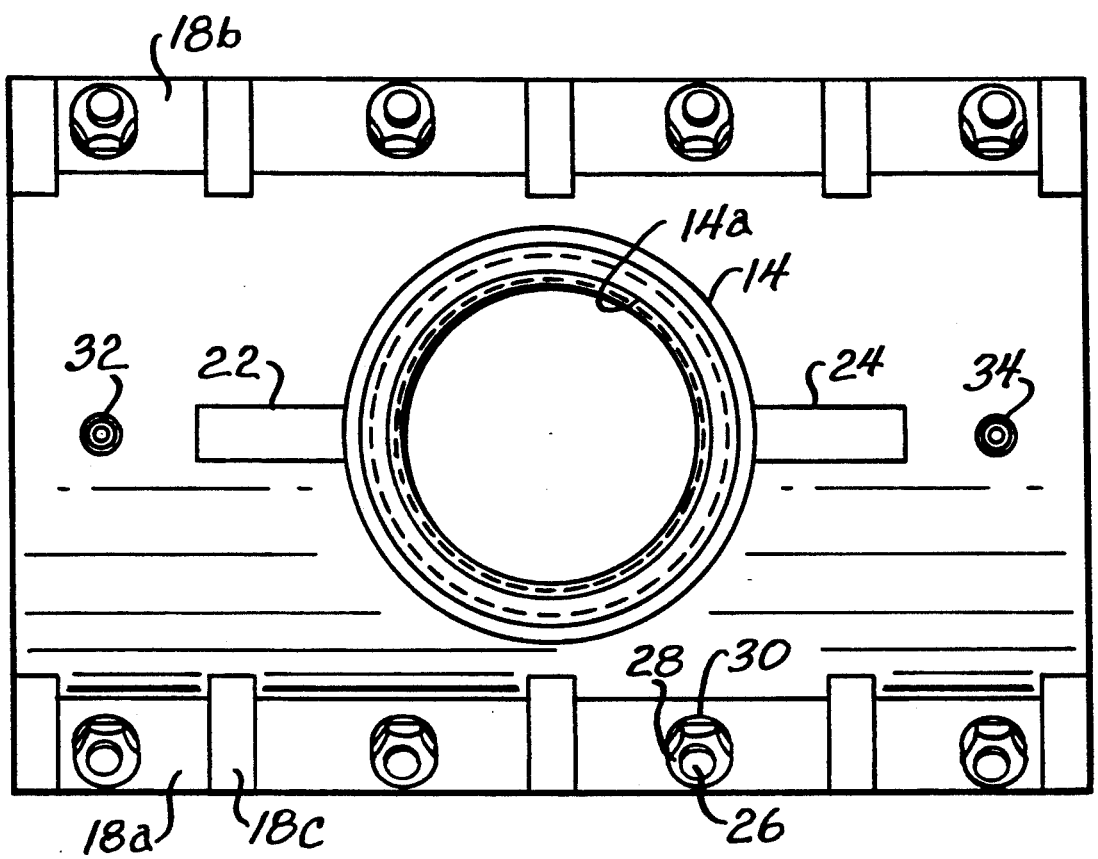
FIG. 4 is a plan view of the electrofusion fitting of FIGS. 1 and 2.

Referring to FIGS. 1 and 4, there are respectively shown side elevation and plan views of an electrofusion fitting 10 in accordance with the principles of the present invention. An end view shown partially in phantom and partially cut-away of the electrofusion fitting 10 positioned on a distribution line 12 is shown in FIG. 2.

The electrofusion fitting 10 is adapted for tight fitting engagement with and positioning around the outer periphery of the distribution line 12. In a preferred embodiment, electrofusion fitting 10 and distribution line 12 are comprised of a high strength, rigid plastic such as polyethylene. Various other similar materials well known to those skilled in the relevant art which are capable of forming a high strength bond by means of electrofusion may be used in the present invention. Electrofusion fitting 10 includes a generally cylindrical sleeve 16 comprised of an arcuate upper sleeve member 18 and an arcuate lower sleeve member 20. The upper and lower sleeve members 18, 20 when joined in a manner described below form a generally cylindrical structure adapted for tight fitting positioning about the distribution line 12. Disposed on the upper sleeve member 18 and extending radially from the distribution line 12 is a cylindrical flange 14. Cylindrical flange 14 is comprised of the same material as sleeve 16, i.e., a high strength plastic such as polyethylene, and is disposed in a sealed manner about an aperture within the upper sleeve member 18. Cylindrical flange 14 includes a distal threaded end portion 14a and is adapted to receive a tapping tool 40 for cutting a hole in the distribution line 12 as described below. First and second radial reinforcing ribs 22 and 24 coupled to the upper sleeve member 18 and the cylindrical flange 14 increase the strength and rigidity of the electrofusion fitting 10.

Upper sleeve member 18 includes first and second flanges 18a and 18b on opposed end portions of the sleeve member. Similarly, the lower sleeve member 20 includes first and second flanges 20a, 20b on opposed end portions of the sleeve member. Each of the first and second flanges 18a, 18b of the upper sleeve member 18 and the first and second flanges 20a, 20b of the lower sleeve member 20 include a plurality of spaced apertures therein. Each of these apertures is adapted for alignment with the corresponding apertures in the other sleeve member so that each pair of aligned apertures is adapted to receive the combination of a nut 28 and a bolt 26. These nut and bolt 28, 26 combinations are adapted for securely coupling the upper and lower sleeve members 18, 20 in tight fitting engagement about the periphery of the distribution line 12. A plurality of spaced lateral reinforcing ribs 18c are coupled to the first and second flanges 18a, 18b of the upper sleeve member 18 along the length thereof. Similarly, a plurality of lateral reinforcing ribs 20c are coupled to each of the first and second flanges 20a, 20b of the lower sleeve member 20. These lateral reinforcing ribs increase the strength and rigidity of the upper and lower sleeve members 18, 20 and the coupling therebetween.

Figure 2:
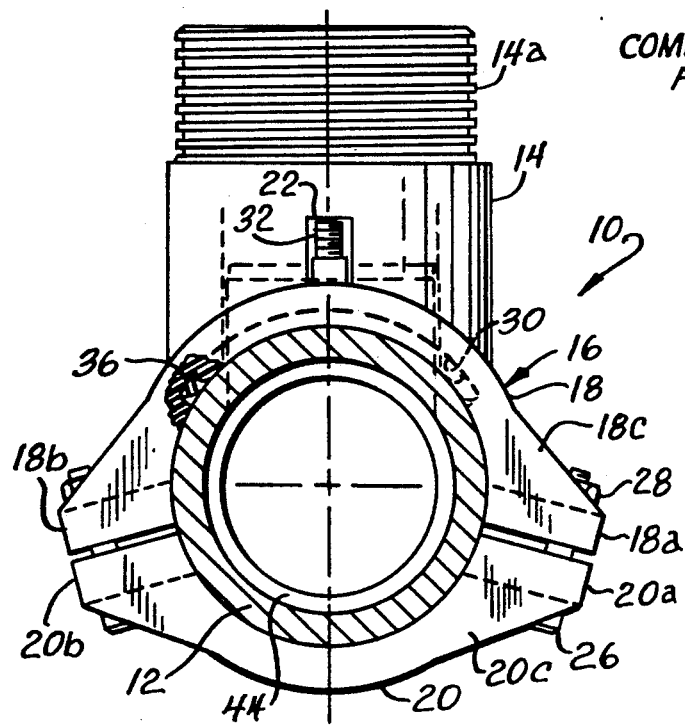
FIG. 2 is an end-on view shown partially cut-away and in phantom of the electrofusion fitting and distribution line combination of FIG. 1.

Disposed on an inner surface of the upper sleeve member 18 about the aperture therein leading to the cylindrical flange 14 is a recessed portion 30 shown in phantom in FIG. 2. Recessed portion 30 is generally circular and is symmetrically disposed about the aperture in the upper sleeve member 18. Recessed portion 30 is adapted to receive an O-ring type gasket 36 preferably comprised of rubber or neoprene. Gasket 36 is also generally circular and is adapted for tight fitting engagement within the recessed portion 30 of the upper sleeve member 18. Gasket 36 is positioned intermediate the upper sleeve member 18 and an upper surface of the distribution line 12. When the aforementioned nut and bolt combinations are tightened for securely coupling the upper and lower sleeve members 18, 20 and rigidly attaching the electrofusion fitting 10 to the distribution line 12, gasket 36 forms a temporary seal between the fitting and distribution line about the cylindrical flange 14. This temporary seal allows the tapping tool 40 having a cutting bit 42 disposed on the end thereof to be inserted in the cylindrical flange 14 for cutting a hole in the distribution line 12. The tapping tool 40 may then be removed from the cylindrical flange 14 with the seal about the cylindrical flange maintained by gasket 36 to permit a line plug 44 to be inserted into the distribution line through the cylindrical flange 14 as shown in FIG. 2. Line plug 44 may assume various forms such as a "butterfly" seal, well known to those skilled in the relevant art. As the line plug 44 is inserted in position within the distribution line 12, the seal about the cylindrical flange 14 between sleeve 16 and the distribution line is maintained by gasket 36.

Figure 3:
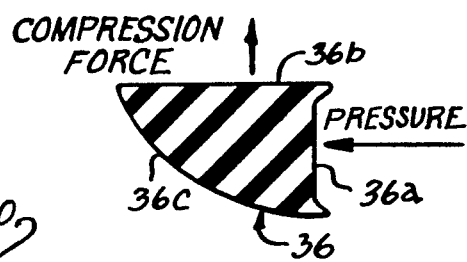
FIG. 3 is a sectional view of an O-ring seal used in the electrofusion fitting of the present invention.

Referring to FIG. 3, there is shown a sectional view of a gasket 36 for use in a preferred embodiment of the present invention. Gasket 36 includes a recessed side 36a, a flat side 36b, and an arcuate side 36c. The pressure of the gas within the distribution line is generally in the direction of the arrow shown in FIG. 3. With the pressure directed primarily onto the recessed side 36a of gasket 36, the recessed configuration of this portion of the gasket tends to concentrate the pressure into the center of the gasket parallel to the direction of the arrow shown in FIG. 3. The flat side 36b of gasket 36 is in contact with the upper, inner surface of the upper sleeve member 18 forming the recessed portion 30 therein. With the recessed side 36a of gasket 36 directing the pressure generally to the center of the gasket, the arcuate side 36c of the gasket then re-directs the pressure within the gasket toward the flat side 36b of the gasket. This concentrating and redirection of the force on the gasket 36 to its flat side 36b maintains the gasket in tight sealing engagement with the recessed portion 30 of the upper sleeve member 18 in a self-sealing manner.

Figure 5:
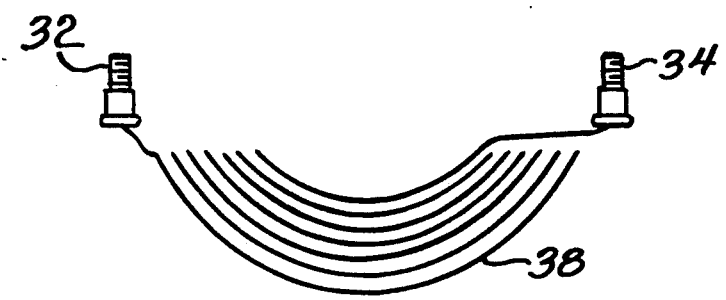
FIG. 5 is a simplified schematic diagram of an electrofusion arrangement for use in the fitting of the present invention.

Attached to the upper sleeve member 18 are first and second electrodes 32 and 34 which are adapted for coupling to a voltage source (not shown in the figures for simplicity). The first and second electrodes 32, 34 are electrically coupled together by means of a conductor, or wire, 38 as shown in FIG. 5. Conductor 38 is disposed intermediate the distribution line 12 and sleeve 16. Conductor 38 is also disposed about the aperture in the upper sleeve member 18 leading to the cylindrical flange 14. Conductor 38 has a general saddle-like shape due to the complimentary arcuate configurations of the line 12 and the upper sleeve member 18. Conductor 38 is capable of carrying substantial current for heating to temperatures sufficient to melt immediately adjacent, facing portions of the distribution line 12 and the inner surface of the upper sleeve member 18. By thus heating adjacent portions of the distribution line 12 and the upper sleeve member 18 to a fluid state, the upper sleeve member becomes fused to the distribution line in forming a high strength, sealed connection therebetween. The electrofusion seal thus formed between the distribution line 12 and the upper sleeve member 18 then replaces the temporary seal of gasket 36 in providing permanent sealed engagement between the distribution line and sleeve 16. Typically, gasket 36 would form a temporary seal in the electrofusion fitting 10 during tapping of the distribution line 12 and insertion of a line plug therein or connection of a branch line to the distribution line via cylindrical flange 14. After the necessary work is performed on the gas distribution system while distribution line 12 is sealed, an electrofusing current would then be passed through conductor 38 for electrofusing together adjacent portions of the distribution line and the upper sleeve member 18. Following this electrofusion coupling between distribution line 12 and upper sleeve member 18, gasket 36 is not needed to form a seal between the distribution line and sleeve 16 and, in fact, may be damaged or destroyed during electrofusion heating of adjacent portions of fitting 10.

There has thus been shown an electrofusion fitting for sealing a distribution line, such as a gas main, to either permit work to be performed on the gas distribution network while the line is plugged or for attaching a branch line while the distribution line remains sealed. The electrofusion fitting, which is preferably comprised of a high strength plastic such as polyethylene as is the distribution line, includes upper and lower arcuate sleeve members securely coupled together about the distribution line by conventional means. An upper sleeve member has extending therefrom a cylindrical flange which is adapted for receiving a tapping tool and line plug for sealing the line or for coupling to a branch line. A self-sealing gasket disposed intermediate the distribution line and fitting about the aperture therein leading to the cylindrical flange forms a temporary seal between the fitting and line during tapping and plugging of the line or attachment of a branch line to the cylindrical flange. After the necessary work on the distribution network is performed and the line plug is withdrawn or the branch line is connected, electrical current is provided to a conductor disposed intermediate the fitting and the distribution line by means of a pair of electrodes in the fitting for electrofusing the fitting to the line in forming a permanent seal therebetween. The electrofusion fitting of the present invention is easily and quickly installed, rugged and of high strength, self-contained and relatively inexpensive.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. An electrofusion fitting for inserting a plug therein or for coupling a branch line to a distribution line in a sealed manner, said fitting comprising:

a generally cylindrical sleeve disposed in tight-fitting engagement with an outer peripheral portion of the distribution line such that the distribution line is disposed within said cylindrical sleeve, said sleeve having an aperture in a lateral portion thereof;

a generally cylindrical flange coupled to said sleeve and extending radially from the distribution line, wherein said flange is adapted to receive a tapping tool for cutting a hole in the distribution line for either inserting a plug therein for sealing the distribution line or for connecting a branch line to the distribution line;

gasket means disposed intermediate said sleeve and the distribution line and about the aperture in said sleeve for forming a temporary seal between said sleeve and the distribution line, said gasket means including a self-sealing O-ring; and electrofusion means disposed intermediate said sleeve and the distribution line about said gasket means for heating and fusing adjacent portions of said sleeve and distribution line in forming a permanent seal therebetween.

2. The fitting of claim 1 further comprising retaining means disposed on an inner surface of said sleeve about the aperture therein for receiving and stably retaining said gasket means in position in the fitting.

3. The fitting of claim 2 wherein said retaining means includes a recessed portion on the inner surface of said sleeve about the aperture therein.

4. The fitting of claim 3 wherein said sealing means comprises an O-ring and said recessed portion is generally circular.

5. An electrofusion fitting for inserting a plug therein or for coupling a branch line to a distribution line in a sealed manner, said fitting comprising:

a generally cylindrical sleeve disposed in tight-fitting engagement with an outer peripheral portion of the distribution line such that the distribution line is disposed within said cylindrical sleeve, said sleeve having an aperture in a lateral portion thereof;

a generally cylindrical flange coupled to said sleeve and extending radially from the distribution line, wherein said flange is adapted to receive a tapping tool for cutting a hole in the distribution line for either inserting a plug therein for sealing the distribution line or for connecting a branch line to the distribution line;

gasket means disposed intermediate said sleeve and the distribution line and about the aperture in said sleeve for forming a temporary seal between said sleeve and the distribution line, said gasket means including a self-sealing O-ring having a first recessed side portion for directing pressure into a center portion of said O-ring seal; and electrofusion means disposed intermediate said sleeve and the distribution line about said gasket means for heating and fusing adjacent portions of said sleeve and distribution line in forming a permanent seal therebetween.

6. The fitting of claim 5 wherein said self-sealing O-ring further includes a second curvilinear side portion for directing pressure in said O-ring seal to a generally flat side portion of said O-ring seal in contact with said sleeve.

7. The fitting of claim 6 wherein said self-sealing O-ring is comprised of rubber or neoprene.

8. The fitting of claim 1 wherein said distribution line, said sleeve and said flange are comprised of a high strength, rigid plastic.

9. The fitting of claim 8 wherein said high strength, rigid plastic is polyethylene.

10. The fitting of claim 1 wherein said sleeve includes an upper sleeve portion including said aperture, a lower sleeve portion and means for securely coupling said upper and lower sleeve portions.

11. The fitting of claim 10 wherein said means for coupling said upper and lower sleeve portions includes a plurality of nut and bolt combinations.

12. The fitting of claim 11 wherein each of said upper and lower sleeve portions includes first and second lateral flange portions extending the length of a respective sleeve portion, and wherein each of said lateral flange portions includes a plurality of spaced apertures, with each of said apertures adapted to receive a respective nut and bolt combination.

13. The fitting of claim 12 wherein each of said sleeve portions further includes a plurality of first reinforcing ribs coupled to each of said lateral flanges.

14. The fitting of claim 13 further comprising a plurality of second reinforcing ribs coupled to said cylindrical flange and to said upper sleeve portion.

15. The fitting of claim 1 wherein said cylindrical flange includes a threaded distal end portion for coupling to a branch line.

16. The fitting of claim 1 wherein said electrofusion means includes first and second electrodes disposed in said sleeve and an electrical conductor coupled to said electrodes, wherein said electrodes are adapted for coupling to a voltage source.

17. A method for coupling a branch line to or sealing off a distribution line, said method comprising the steps of:

securing a fitting to the distribution line about the circumference thereof, wherein said fitting includes an aperture and a flange on a side portion thereof;

forming a temporary mechanical seal between the distribution line and said fitting about the aperture therein;

tapping a hole in the distribution line through said flange and the aperture in said fitting and within said mechanical seal;

inserting a plug in the distribution line through the hole tapped therein for sealing off the distribution line or attaching a branch line to said flange; and heating facing adjacent portions of the distribution line and said fitting about the aperture in said fitting to form a permanent electrofusion seal between the distribution line and said fitting.

18. The method of claim 17 wherein the step of securing said fitting to the distribution line includes clamping together an upper sleeve member and a lower sleeve member forming said fitting and disposed about a circumference of the distribution line.

19. The method of claim 18 wherein the step of forming said temporary mechanical seal includes drawing adjacent portions of said fitting and the distribution line toward one another so as to securely engage a gasket disposed therebetween and about the aperture in said fitting.

20. The method of claim 19 wherein adjacent portions of said fitting and the distribution line are drawn together by securely and tightly clamping together said upper and lower sleeve members.

21. The method of claim 17 wherein the step of heating facing adjacent portions of the distribution line and said fitting includes directing an electrical current through a conductor disposed intermediate the distribution line and said fitting so as to melt adjacent portions thereof so as to fuse said adjacent portions of said fitting and the distribution line.

* * * * *